(12) United States Patent
Yano et al.

(10) Patent No.: US 6,406,010 B1
(45) Date of Patent: *Jun. 18, 2002

(54) FLUID-FILLED ACTIVE VIBRATION DAMPING DEVICE

(75) Inventors: Katsuhisa Yano, Inuyama; Takashi Yoshida, Kasugai; Katsuhiro Goto; Yoshihiko Hagino, both of Inuyama, all of (JP)

(73) Assignee: Tokai Rubber Industries, Ltd., Komaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/495,285

(22) Filed: Jan. 31, 2000

(30) Foreign Application Priority Data

Feb. 5, 1999 (JP) ............................................ 11-029095

(51) Int. Cl.⁷ ............................. F16F 05/00; F16F 06/00
(52) U.S. Cl. ........................... 267/140.14; 267/140.13; 267/140.15
(58) Field of Search ................... 267/140.11, 140.12, 267/140.13, 140.14, 141, 140.3, 140.4, 141.4

(56) References Cited

U.S. PATENT DOCUMENTS

| | | | | |
|---|---|---|---|---|
| 2,900,162 A | * | 8/1959 | Crede et al. ................. | 248/358 |
| 5,344,128 A | * | 9/1994 | Kobayashi et al. ..... | 267/140.14 |
| 5,492,311 A | * | 2/1996 | Kurr et al. ............. | 267/140.13 |
| 5,540,419 A | * | 7/1996 | Kurr et al. ............. | 267/140.13 |
| 5,601,280 A | * | 2/1997 | Nagaya et al. .......... | 267/140.14 |
| 5,653,427 A | * | 8/1997 | Matsuda et al. ........ | 267/140.14 |
| 5,848,782 A | * | 12/1998 | Hein et al. ............. | 267/140.11 |
| 5,911,412 A | * | 6/1999 | Durand et al. .......... | 267/140.13 |
| 5,947,457 A | * | 9/1999 | Swanson et al. ........ | 267/140.14 |
| 5,988,610 A | * | 11/1999 | Hiraki et al. .......... | 267/140.13 |

FOREIGN PATENT DOCUMENTS

| | | | | |
|---|---|---|---|---|
| EP | 0331951 A2 | * | 9/1989 | |
| EP | 0 529 133 A1 | | 8/1991 | |
| EP | 0 490 719 A1 | | 11/1991 | |
| EP | 0 536 760 A1 | | 8/1992 | |
| GB | 2 278 180 A | | 11/1994 | |
| JP | 59103045 A | * | 6/1984 | ............ 267/140.14 |
| JP | 59117930 A | * | 7/1984 | ............ 267/140.14 |
| JP | 6057032 A | * | 4/1985 | ............ 267/140.14 |
| JP | 2-42228 | | 2/1990 | |
| JP | 4171335 A | * | 6/1992 | |
| JP | 5-149372 | | 6/1993 | |
| JP | 5231469 A | * | 7/1993 | ............ 267/140.14 |
| JP | 5312232 A | * | 11/1993 | ............ 267/140.14 |
| JP | 6185568 A | * | 7/1994 | ............ 267/140.15 |
| JP | 2510914 | | 4/1996 | |
| JP | 2510925 | | 4/1996 | |
| JP | 9-49451 | | 2/1997 | |
| JP | 9-89040 | | 3/1997 | |
| JP | 10-47426 | | 2/1998 | |

\* cited by examiner

Primary Examiner—Paul N. Dickson
Assistant Examiner—Melody M. Burch
(74) Attorney, Agent, or Firm—Burr & Brown (57) ABSTRACT

A fluid-filled active vibration damping device, including an elastic body which is elastically deformed when a vibration is input to the damping device and which partially defines a pressure receiving chamber as a portion of a fluid chamber filled with a non-compressible fluid, an oscillating body which partially defines the pressure receiving chamber, a drive device which oscillates the oscillating body, so as to control a pressure of the non-compressible fluid in the pressure receiving chamber, the drive device comprising an output member which is formed independent of the oscillating body and which is movable in a direction of oscillation of the oscillating body, a first biasing device which biases the oscillating body toward the output member of the drive device, and a second biasing device which biases the output member of the drive device toward an outside surface of the oscillating body, so that the output member is held in direct or indirect contact with the outside surface of the oscillating body.

11 Claims, 6 Drawing Sheets

FLUID-FILLED ACTIVE VIBRATION DAMPING DEVICE

BACKGROUND OF THE INVENTION

1. Field of the Invention

The present invention relates in general to a fluid-filled active vibration damping device which actively damps the vibration of an object by controlling the pressure of non-compressible fluid filling a pressure receiving chamber of the damping device, and in particular to such a fluid-filled active vibration damping device which is suitably used as an engine mount or a vibration damper in an automotive vehicle.

2. Related Art Statement

For damping vibration (including noise due to the vibration) of an object to be damped, such as the body or other members of an automotive vehicle that are subject to vibration, there have been various vibration damping devices such as a vibration damping connector and a vibration damper. The vibration damping connector, such as an engine mount, is interposed between a vibration source and an object whose vibration is to be damped, in order to damp the vibration to be transmitted from the vibration source to the object. The vibration damper, such as a dynamic damper, is attached directly to the object to absorb or damp the vibration of the object.

In this background, there has been proposed a fluid-filled active vibration damping device, as an example of such a vibration damping device as described above, as disclosed in Japanese Patent Applications TOKU-KAI-HEI No. 2-42228 and No. 9-49541 and Japanese Patents No. 2510914 and No. 2510925. Such a fluid-filled active vibration damping device includes (a) an elastic body which is elastically deformed when a vibration is input to the damping device and which partially defines a pressure receiving chamber filled with a non-compressible fluid; (b) an oscillating body which partially defines the pressure receiving chamber; and (c) a drive device which oscillates the oscillating body, so as to control a pressure of the non-compressible fluid in the pressure receiving chamber. In this vibration damping device, the pressure of the non-compressible fluid in the pressure receiving chamber is so controlled as to adjust the vibration damping characteristics of the damping device and thereby exhibit an active vibration damping effect, or to generate a controlled oscillating force and thereby actively damp the vibration of an object.

Meanwhile, in the vibration damping device constructed as described above, it is required that an output member of the drive be connected to the oscillating body, in order to transmit the output force of the drive device to the oscillating body. To this end, it has conventionally been practiced, as disclosed in the above-indicated publications, that the output member of the drive device is directly fixed to the oscillating body with a bolt, by press-fitting, or by caulking.

However, each of the above-indicated fixing methods has the problem that to fix the output member to the oscillating body is cumbersome, and accordingly is not suitable for the mass production of vibration damping devices. In addition, when the output member is fixed to the oscillating body, external forces are applied to the oscillating body, so that a large deformation may be produced in the oscillating body or a large strain may be left in the same. This problem leads to decreasing the life expectancy of those elements or lowering the accuracy of assembling of the same. Moreover, the defective assembling of the output member and the oscillating body leads to unstable accuracy of the products, which in turn leads to unstable performance of the same. Furthermore, the above-indicated fixing methods cannot assure that the output member remains fixed to the oscillating body with a sufficiently great strength for a long period of use.

For example, the bolt-using fixing method has the problem that it needs the technique and control to maintain a constant bolt-fastening torque and, in some cases, needs a mechanism for locking a bolt-loosening preventing screw, and the problem that to screw the bolt is cumbersome and time-consuming. The press-fitting fixing method has the problem that it needs a high accuracy of control of dimensions of the elements, in order to obtain stably sufficiently great fixing strength and reliability, and the problem that each element needs a sufficiently great strength to stand the load applied thereto upon press-fitting. The caulking fixing method has the problem that it needs a large-size caulking device and the problem that each element needs a sufficiently great strength to stand the load applied thereto upon caulking. In each of the above-indicated fixing methods, external forces, such as screwing force or press-fitting force, are inevitably applied to the oscillating body and accordingly strains are left in the same, so that the accuracy of dimensions of the oscillating body and the life expectancy of the same may be lowered.

There is also known a vibration damping device which additionally includes (d) a flexible diaphragm which partially defines an equilibrium chamber which is provided on one of both sides of the oscillating body that is opposite to the other side thereof on which the pressure receiving chamber is provided, the equilibrium chamber being filled with the non-compressible fluid, a volume of the equilibrium chamber being changed by deformation of the flexible diaphragm; and (e) an orifice for fluid communication between the pressure receiving chamber and the equilibrium chamber. This damping device additionally exhibits a passive vibration damping effect based on the resonance of the fluid flowing through the orifice. In this case, since, the pressure receiving chamber and the equilibrium chamber, each filled with the non-compressible fluid, are provided on both sides of the oscillating body, respectively, it is very difficult to fix directly the output member of the drive device to the oscillating body, in view of not only the structure of the damping device but also the fixing operation itself.

SUMMARY OF THE INVENTION

It is therefore an object of the present invention to provide a fluid-filled active vibration damping device including a novel drive-force transmitting structure which can transmit, with high durability and reliability, a drive force of a drive device to an oscillating body, and which can be simply constructed and assembled.

To this end, the present invention provides a fluid-filled active vibration damping device which has one or more of the technical features that are described below in respective paragraphs given parenthesized sequential numbers (1) to (8). Any technical feature which includes another feature shall do so by referring, at the beginning, to the parenthesized sequential number given to that feature. Thus, two or more of the following technical features may be combined, if appropriate. Each technical feature may be accompanied by a supplemental explanation, as needed. However, the following technical features and the appropriate combinations thereof are just examples to which the present invention is by no means limited. Rather, the concept of the present invention should be understood based on the entire description of the specification and the entire illustration of the drawings.

(1) According to a first feature of the present invention, there is provided a fluid-filled active vibration damping device, comprising an elastic body which is elastically deformed when a vibration is input to the damping device and which partially defines a pressure receiving chamber as a portion of a fluid chamber filled with a non-compressible fluid; an oscillating body which partially defines the pressure receiving chamber; a drive device which oscillates the oscillating body, so as to control a pressure of the non-compressible fluid in the pressure receiving chamber, the drive device comprising an output member which is formed independent of the oscillating body and which is movable in a direction of oscillation of the oscillating body; a first biasing device which biases the oscillating body toward the output member of the drive device; and a second biasing device which biases the output member of the drive device toward an outside surface of the oscillating body, so that the output member is held in direct or indirect contact with the outside surface of the oscillating body.

In the fluid-filled active vibration damping device according to the first feature (1) of the present invention, the output member of the drive device is formed independent of the oscillating body which partially defines the pressure receiving chamber as a portion of the fluid chamber, and the output member and the oscillating body can be held in pressed contact with each other by the respective biasing forces of the first and second biasing devices, in the direction of oscillation of the oscillating body. When the output member is displaced toward, or away from, the oscillating body by the drive force of the drive device, the output member is maintained in pressed contact with the oscillating body, owing to the drive force of the drive device and the biasing force of the first biasing device, or the biasing force of the second biasing device, so that the drive force of the drive device can be stably transmitted to the oscillating body in the direction in which the oscillating body is pushed and drawn.

Thus, it is not needed to fix the output member to the oscillating body with a bolt, by press-fitting, or by caulking. Rather, the output member and the oscillating body can be assembled in the state in which the two elements are just in contact with each other. Therefore, the present damping device can enjoy a simple construction, and can be easily assembled and accordingly be mass-produced. Since no physical fixing means such as a bolt, press-fitting, or caulking is interposed between the output member and the oscillating body, external forces applied to the oscillating body when the output member and the oscillating body are assembled can be minimized or even zeroed. Thus, substantial fixing of the output member and the oscillating body can be achieved with high durability and reliability, and the drive force of the drive device can be stably transmitted to the oscillating body.

In the present damping device, the first and second biasing devices apply the respective biasing forces to the oscillating body and the output member in the opposite directions, respectively. Therefore, at a neutral position of the oscillating body where no drive force is applied thereto from the output member, the respective biasing forces of the two biasing devices can be prevented from being directly applied to the oscillating body or a drive-force generating device of the drive device. Thus, at the neutral position, the respective biasing forces of the two biasing devices can be prevented from acting as significant external forces on the oscillating body, and accordingly the problems that the oscillating body is deformed and the life expectancy thereof is lowered are avoided. In addition, the output force of the drive device that is needed to displace the oscillating body away from its neutral position, can be decreased, which contributes to improving the energy efficiency of the present damping device.

In addition, since the first and second biasing devices apply the respective biasing forces to the oscillating body and the output member in the opposite directions, respectively, a restoring force is effectively generated which restores the oscillating body to its neutral position. Accordingly, for example, the drive device may be either of a double-acting type, or of a single-acting type wherein a drive force is exhibited in one direction only. In each case, the output member and the oscillating body are advantageously held in pressed contact with each other, owing to the respective biasing forces of the first and second biasing devices, so that the present damping device can operate in a stable manner.

The drive device is just required to have the output member which can apply, to the oscillating body, a drive force having a desired frequency. Accordingly, for example, the drive device may be provided by an electromagnetic actuator which utilizes an electromagnetic force, or a pneumatic actuator which utilizes an air pressure. The oscillating body is just required to be displaceable by the drive device. For example, the oscillating body may be provided by an elastic plate member which is displaceable by elastic deformation thereof, a hard plate member which is allowed to displace over a predetermined stroke, or a complex body which includes a hard displaceable member and an elastically deformable, annular support member which surrounds the displaceable member and which causes, when being elastically deformed, the displacement of the displaceable member. The first and second biasing devices are just required to bias the oscillating body and the output member in the opposite directions, respectively, in which the two elements are brought into contact with each other. For example, each of the two biasing devices may be provided by a coil spring, a biasing rubber member, or a leaf spring. The second biasing device may be provided as an integral portion of the drive device. The output member of the drive device may be held in direct contact with the oscillating body, or held in indirect contact with the body via a third member such as a flexible diaphragm which will be described later.

In short, in the present damping device, the output member of the drive device is held in contact with the oscillating body, owing to the respective biasing forces of the first and second biasing devices, so that the drive force of the drive device is transmitted from the output member to the oscillating body and accordingly the oscillating body is displaced or oscillated. Therefore, it is not needed to fix physically the output member of the drive device to the oscillating body. Accordingly, the output member and the oscillating body are easily assembled and, when the two elements are assembled, no significant forces are exerted to the oscillating body, which contributes to improving the durability of the oscillating body. In addition, the present damping device is free from the problem that the accuracy of dimensions of the product is lowered because of the defective assembling of the output member and the oscillating body, and the problem that the stability of operation of the product is lowered because of coming of the output member off the oscillating body. Thus, the present damping device can enjoy much improved life expectancy and reliability.

(2) According to a second feature of the present invention that includes the first feature (1), the oscillating body comprises a hard displaceable member which is provided in a central portion thereof with which the output member of the drive device is held in contact; and an elastically deformable, annular support member which is provided around the displaceable member and which allows, when being elastically deformed, the displaceable member to be displaced.

In this vibration damping device, the central portion of the oscillating body is defined by the hard displaceable member, and the output member of the drive device is held in pressed contact with the hard displaceable member. Therefore, the pressed contact of the output member with the oscillating body can be maintained in a more stable manner.

(3) According to a third feature of the present invention that includes the first or second feature (1) or (2), the fluid-filled active vibration damping device further comprises an inside press member which has a planar contact surface held in contact with an inside surface of the oscillating body; and an outside press member which is provided integrally with the output member of the drive device and which has a planar contact surface held in contact with the outside surface of the oscillating body, and the first biasing device indirectly biases the oscillating body via the inside press member and the second biasing device indirectly biases the output member via the outside press member.

In the present damping device, the respective biasing forces of the first and second biasing devices are transmitted to the oscillating body and the output member, respectively, in a more stable manner via the respective planar contact surfaces of the inside and outside pressure members. In addition, since the respective biasing forces of the first and second biasing devices act on the oscillating body and the output member, respectively, over respective wide areas via the respective planar contact surfaces of the inside and outside pressure members, the present damping device is prevented from unstable operation because of local transmission of the respective biasing forces to the oscillating body and the output member. Rather, respective great biasing forces are stably transmitted to the two elements. Moreover, since a portion of the oscillating body that corresponds to the inside and outside press members is prevented from deformation, by the two press members, the oscillating body may be provided by an elastic plate member which, however, does not have a hard displaceable member in a central portion thereof. In the last case, too, the pressed contact of the output member with the oscillating body can be stably maintained, which leads to improving the stability of operation of the damping device and the durability of the same.

(4) According to a fourth feature of the present invention that includes any one of the first to third features (1) to (3), the pressure receiving chamber comprises a primary chamber in which the pressure of the non-compressible fluid is directly changed when the elastic body is elastically deformed; and an auxiliary chamber in which the pressure of the non-compressible fluid is directly changed when the oscillating body is oscillated, and the damping device further comprises means for defining a first orifice for fluid communication between the primary chamber and the auxiliary chamber, so that a change of the pressure of the non-compressible fluid in the auxiliary chamber that is caused by the oscillation of the oscillating body is transmitted to the non-compressible fluid in the primary chamber via the first orifice.

In this damping device, the change of pressure of the non-compressible fluid in the auxiliary chamber, caused by the displacement of the oscillating body, can be efficiently transmitted to the primary chamber, by utilizing the resonance of the fluid flowing through the first orifice. That is, the small oscillating force applied to the oscillating body can be utilized to control the pressure of the non-compressible fluid in the large primary chamber and thereby obtain an active vibration damping effect. In addition, if the structure and shape of the auxiliary chamber are appropriately selected, a wall defining the auxiliary chamber can be utilized to provide, in the auxiliary chamber, the first biasing device, such as a coil spring, which bridges between the wall and the oscillating body.

(5) According to a fifth feature of the present invention that includes any one of the first to fourth features (1) to (4), the fluid-filled active vibration damping device further comprises a flexible diaphragm which partially defines an equilibrium chamber which is provided on one of both sides of the oscillating body that is opposite to the other side thereof on which the pressure receiving chamber is provided, the equilibrium chamber being filled with the non-compressible fluid, a volume of the equilibrium chamber being changed by deformation of the flexible diaphragm, the pressure receiving chamber and the equilibrium chamber cooperating with each other to provide the fluid chamber; and means for defining a second orifice for fluid communication between the pressure receiving chamber and the equilibrium chamber, and the output member of the drive device is formed independent of the oscillating body and the flexible diaphragm and is held in indirect contact with the outside surface of the oscillating body via the flexible diaphragm.

When a vibration is input to this damping device, the elastic body is elastically deformed and the pressure of the non-compressible fluid in the pressure receiving chamber is changed, so that a pressure difference is produced between the pressure receiving chamber and the equilibrium chamber and the fluid flows through the second orifice. The present damping device can exhibit a passive vibration damping effect based on the fluid flowing through the second orifice, e.g., the resonance of the fluid. In particular, in the case where the passive vibration damping effect based on the fluid flowing through the second orifice is tuned to, and exhibited at, a lower frequency range than that to which and at which the active vibration damping effect based on the oscillation of the oscillating body is tuned and exhibited, the damping device can advantageously exhibit both of the passive and active vibration damping effects. In addition, since the equilibrium chamber is provided on the other side of the oscillating body that is opposite to the one side thereof on which the pressure receiving chamber is provided, it can easily form the equilibrium chamber in a wide space and with a great volume. Moreover, since the output member of the drive device is formed independent of the oscillating body and the flexible diaphragm, and is held in contact with the oscillating body via a flexible diaphragm, it is not needed to hold the output member in contact with the oscillating body such that the output member extends through the diaphragm. Thus, the present damping device can enjoy a simple construction. Furthermore, since it is not needed to assemble the output member of the drive device and the oscillating body in a mass of the non-compressible fluid, the present device can be manufactured with a high efficiency. In addition, since the output member is formed independent of the flexible diaphragm that partially defines the equilibrium chamber, the diaphragm is not subjected to any significant external forces when the output member is assembled with other members of the damping device. Thus, the durability of the diaphragm is improved.

(6) According to a sixth feature of the present invention that includes the fifth feature (5), the oscillating body comprises a hard displaceable member which is provided in a central portion thereof with which the output member of the drive device is held in contact; and an elastically deformable, annular support member which is provided around the displaceable member and which allows, when being elastically deformed, the displaceable member to be displaced, and the flexible diaphragm comprises a hard connecting member which is provided in a central portion thereof sandwiched by, and between, the displaceable member of the oscillating body and the output member of the drive device and which is fixed to the displaceable member.

In this damping device, the oscillating body and the diaphragm are prevented from being displaced relative to each other, and accordingly defective transmission of the oscillating force to the oscillating member because of, e.g., out-of-position movement of the diaphragm, or wrinkle of the same is avoided. In addition, the diaphragm is freed of the problem that the durability thereof is lowered by friction-caused wearing thereof.

(7) According to a seventh feature of the present invention that includes any one of the first to sixth features (1) to (6), the fluid-filled active vibration damping device further comprises a first mounting member and a second mounting member which are elastically connected to each other by the elastic body, the oscillating body is supported by the second mounting member such that the oscillating body is displaceable, and the drive device is supported by the second mounting member, and one of the first and second mounting members is fixed to an object whose vibration is to be damped by the damping device.

The present fluid-filled active vibration damping device can enjoy a simple construction. In particular, in the case where the first mounting member is fixed to one of a vibration transmitting member (e.g., a vibration generating member) and a vibration receiving member (i.e., an object whose vibration is to be damped or prevented) and the second mounting member is fixed to the other member, the present damping device advantageously provides a vibration damping connector, e.g., an engine mount. In addition, in the case where one of the first and second mounting members is fixed to an object whose vibration is to be damped or prevented, so that the other member is elastically supported on the object via the elastic body and thus a vibration system is provided, the present damping device advantageously provides a vibration damper.

(8) According to an eighth feature of the present invention that includes any one of the first to seventh features (1) to (7), the drive device comprises an electromagnetic drive device which includes an axis member as the output member; an outer tubular member which is spaced outward from the axis member in a direction perpendicular to the axis member; and an electromagnetic force generating device which generates, upon application of an electric power thereto, an electromagnetic force for moving the axis member relative to the outer tubular member in an axial direction parallel to the axis member, and the second biasing device comprises at least one annular leaf spring which is provided between the axis member and the outer tubular member, such that an inner peripheral portion of the annular leaf spring is fixed to the axis member and an outer peripheral portion thereof is fixed to the outer tubular member, so that the annular leaf spring positions the axis member relative to the outer tubular member in the direction perpendicular to the axis member while allowing the axis member to be moved relative to the outer tubular member in the axial direction.

In the present damping device, the second biasing device is provided by the annular leaf spring which functions as a positioning device for positioning the output member of the drive device. Accordingly, the total number of parts of the damping device can be decreased, and the damping device can be simply constructed and easily manufactured.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Hereinafter, several embodiments of the present invention will be described in detail by reference to the drawings.

Figure 1:
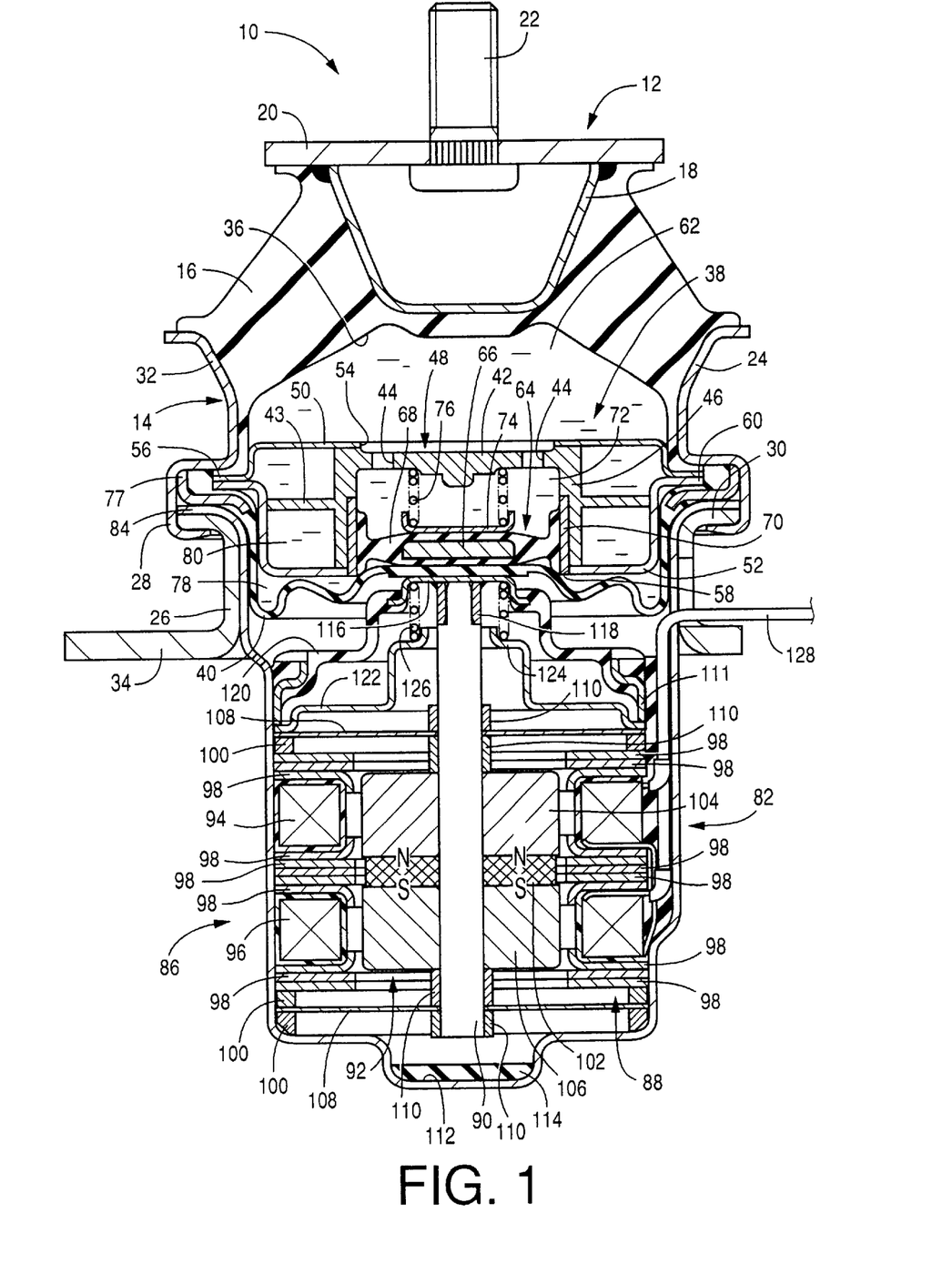
FIG. 1 is a longitudinal cross section of an engine mount for use in an automotive vehicle, as a first embodiment of the present invention.

First, FIG. 1 shows an engine mount 10 for use in an automotive vehicle, as a first embodiment of the present invention. The engine mount 10 includes a first mounting member 12 formed of metal and a second mounting member 14 formed of metal which are spaced from each other by a predetermined distance; and an elastic rubber body 16 which elastically connects the first and second mounting members 12, 14 to each other. The first mounting member 12 is fixed to a power unit (not shown) of the automotive vehicle, and the second mounting member 14 is fixed to a vehicle body as an object whose vibration is to be damped by the engine mount 10. Thus, the engine mount 10 supports the power unit on the vehicle body in a vibration damping fashion. In a state in which the engine mount 10 is used in the automotive vehicle, the weight of the power unit is applied to the engine mount 10, so that the rubber body 16 is compressed and deformed and the first and second mounting members 12, 14 are displaced relative to each other, i.e., toward each other. In this state, a main vibration to be damped is input to the engine mount 10, in a direction in which the first and second mounting members 12, 14 are opposed to each other, i.e., a vertical direction as seen on the drawing sheet of FIG. 1. Hereinafter, this direction will be referred to simply as the "vertical direction".

More specifically described, the first mounting member 12 includes a cup-shaped fixed member 18, and a disc-like top plate 20 which is welded to an upper open end of the fixed member 18. Thus, the first mounting member 12 has a hollow structure. The fixed member 18 has a tapered shape whose diameter increases toward its upper open end. A fixing bolt 22 projects upward from the center of the top plate 20, and is used to fix the first mounting member 12 to the power unit.

The second mounting member 14 includes an upper member 24 and a lower member 26 each of which has a large diameter and a generally cylindrical shape and which have a common axis line and partially overlap each other. The upper member 24 includes a caulking portion 28 in a lower end portion thereof that opens downward, and the lower member 26 includes a caulking portion 30 in an upper end portion thereof that opens upward. The upper and lower members 24, 26 are assembled into the integral second mounting member 14, such that the upper caulking portion 28 is caulked with the lower caulking portion 30. The upper member 24 includes, in an upper end portion thereof that opens upward, a tapered portion 32 whose diameter increases toward the upper opening of the upper member 24, and the tapered portion 32 is opposed to an outer circumferential surface of the fixed member 18 of the first mounting member 12. The lower member 26 includes, in a lower end portion thereof that opens downward, a plate-like fixed portion 34 which extends along a plane perpendicular to the axis line of the lower member 26, and the fixed portion 34 is fixed with a bolt to an engagement portion of the vehicle's body (not shown). Thus, the second mounting member 14 is fixed to the vehicle's body.

The first mounting member 12 is spaced from the upper, open end of the second mounting member 14, such that the first and second mounting members 12, 14 are substantially coaxial with each other and are opposed to each other in the axial direction thereof, and the elastic rubber body 16 is interposed between the two mounting members 12, 14. The rubber body 16 has a substantially truncated-conical shape, that is, a generally cylindrical shape including a thick-walled tapered portion. The rubber body 16 is vulcanized to the first mounting member 12, in the state in which the top plate 20 is fixed to a small-diameter end surface of the rubber body 16 and the fixed member 18 is embedded in the small-diameter end surface. The rubber body 16 is vulcanized to the second mounting member 14, in the state in which the tapered portion 32 of the upper member 24 is fixed to an outer circumferential surface of a large-diameter end surface of the rubber body 16. In short, the first mounting member 12, the upper member 24, and the elastic rubber body 16 are manufactured as an integral vulcanization product. The rubber body 16 has an inverted-cup-shaped void 36 which opens downward in a substantially entire area of a large-diameter end surface of the body 16. The void 26 opens in an inside space of the second mounting member 14.

In an axially intermediate portion of the inside space of the second mounting member 14, there are provided a partition member 38 and a flexible diaphragm 40. The partition member 38 includes a central partition wall 48 having a generally cylindrical, inverted-cup-shaped configuration including a top wall portion 42. The top wall portion 42 has a plurality of communication holes 44 formed through the thickness thereof. The central partition wall 48 additionally includes an annular plate portion 43 extending radially outward from an axially central portion of a cylindrical wall portion 46 of the wall 48. The top wall portion 42, the cylindrical wall portion 46, and the annular plate portion 43 are formed integrally with one another. The partition member 38 additionally includes an upper cover 50 and a lower cover 52 which are provided at axially opposite ends of the central partition wall 48, respectively, and cooperate with each other to sandwich an outer peripheral portion of the same 48. The upper cover 50 has a generally cylindrical, inverted-shallow-cup-shaped configuration including a top wall portion which has a large-diameter aperture 54 formed through the thickness of a central portion thereof. The upper cover 50 includes, as an integral portion thereof, a flange-like support portion 56 extending radially outward from a lower open end of a cylindrical wall portion of the cover 50. The lower cover 52 has a generally cylindrical, shallow-cup-shaped configuration including a bottom wall portion which has a large-diameter aperture 58 formed through the thickness of a central portion thereof. The lower cover 52 includes a flange-like support portion 60 extending radially outward from an upper open end of a cylindrical wall portion of the cover 52. The upper and lower covers 50, 52 are fixedly assembled with the central partition wall 48 in a state in which respective inner peripheral portions of the two covers 50, 52 contact axially opposite end surfaces of the cylindrical wall portion 46 of the partition wall 48, respectively, and the respective support portions 56, 60 contact each other in the axial direction of the partition member 38.

The partition member or body 38 constructed as described above is fixed to the second mounting member 14, in such a manner that the respective annular support portions 56, 60 of the upper and lower covers 50, 52, held in aligned contact with each other, are sandwiched, over their entire circumferential lengths, by, and between, the caulking portion 28 of the upper member 24 and the flange portion 30 of the lower member 26 and the caulking portion 28 is caulked with the flange portion 30. Thus, the partition member 38 is provided at the axially intermediate portion of the inside space of the second mounting member 14, such that the partition member 38 extends along a plane perpendicular to the axis line of the second mounting member 14. Thus, the inside space of the second mounting member 14 is divided into two rooms which are located on both sides of the partition member 38, respectively. An upper one of the two rooms that is above the partition member 38 is defined by, and between, respective opposed surfaces of the elastic rubber body 16 and the partition member 38, and is filled with a non-compressible fluid to provide a primary chamber 62. When a vibrational load is applied to the engine mount 10, the elastic rubber body 16 is elastically deformed and accordingly the pressure of the non-compressible fluid in the primary chamber 62 is directly changed.

In a lower opening of the central partition wall 48 of the partition member 38, there is provided an oscillating member or body 64 having a generally disc-like shape. The oscillating body 64 includes an elastic support plate 68 which is provided by an elastic rubber member and which has a generally large-diameter-disc-like shape; and an oscillating plate 66 which is provided by a hard member formed of, e.g. metal or resin, which has a small-diameter-disc-like shape, and which is embedded in, and thereby fixed to, a central portion of the elastic support plate 68. The elastic support plate 68 provides an annular elastic support member which extends radially outward from an outer peripheral portion of the oscillating plate 66 and which elastically supports the plate 66 on the partition member 38. A fitting ring 70 is vulcanized to an outer circumferential surface of the support plate 68, and the lower opening of the central partition wall 48 is fluid-tightly closed by the oscillating body 64 in a state in which the fitting ring 70 is press-fitted in, and thereby fixed to, an inner circumferential surface of a lower end portion of the partition wall 48. When the elastic support plate 68 is elastically deformed, the oscillating plate 66 is allowed to displace or move in the axial direction of the partition body 38. In the state in which the lower opening of the central partition wall 48 is closed by the oscillating body 64, an auxiliary chamber 72 filled with the non-compressible fluid is provided in an inside space of the partition wall 48, such that the auxiliary chamber 72 is partially defined by the oscillating body 64. When the oscillating body 64 (or the oscillating plate 66) is displaced, the pressure of the non-compressible fluid in the auxiliary chamber 72 is directly changed.

The auxiliary chamber 72 is communicated with the primary chamber 62 via the communication holes 44 formed through the thickness of the top wall portion 42 of the central partition wall 48. Thus, the pressure of the non-compressible fluid in the auxiliary chamber 72 is transmitted to the non-compressible fluid in the primary chamber 62, based on the fluid flowing through the holes 44. In the present embodiment, a length and a cross-sectional area of each of the communication holes 44 are appropriately pre-selected so that the resonance frequency of the fluid flowing through the holes 44 is tuned to the frequency of vibration to be actively damped by the engine amount 10, for example, the frequency of a medium-frequency and medium-amplitude vibration such as idling vibration. Thus, in a frequency range including the frequency of vibration to be actively damped, the change of the pressure of the auxiliary chamber 72 caused by the oscillation of the oscillating body 64 is efficiently transmitted to the primary chamber 62 based on the resonance of the fluid flowing through the holes 44. It emerges from the above description that in the present embodiment, the plurality of communication holes 44 provide a first orifice for fluid communication between the primary chamber 62 and the auxiliary chamber 72 and the primary and auxiliary chambers 62, 72 cooperate with each other to provide a pressure receiving chamber which is partially defined by each of the elastic rubber body 16 and the oscillating body 64.

In the auxiliary chamber 72, there is provided an inside press member 74 which is formed of a hard material such as metal and which has a generally dish-like shape. The inside press member 74 is held in direct contact with a central portion of an upper surface of the oscillating body 64. The inside press member 74 may be fixed to the oscillating body 64. A compression coil spring 76 as a first biasing member or device is provided between respective opposed surfaces of the inside press member 74 and the top wall portion 42 of the central partition member 48. The coil spring 76 applies a biasing force to the inside press member 74 in a direction in which the press member 74 is moved away from the partition wall 48 and pressed against the oscillating body 64. The above-indicated opposed surface of the top wall 42 has a step for positioning the coil spring 76.

The flexible diaphragm 40 is formed of a thin, elastic rubber sheet that is easily deformable, and has a cylindrical-container-like or bag-like shape that opens upward. A bottom portion of the diaphragm 40 is slack or loose to be easily deformable. An outer peripheral portion of the diaphragm 40 that defines the upper opening thereof is vculcanized to an annular support member 77 formed of metal. An entire circumference of the annular support member 77 is sandwiched with the respective support portions 56, 60 of the upper and lower covers 50, 52 of the partition member 38, by, and between, the caulking portion 28 of the upper member 24 of the second mounting member 14 and the flange portion 30 of the lower member 25 of the same 14, and the caulking portion 28 is caulked with the flange portion 30 so that the diaphragm 40 is fixed to the second mounting member 14. Thus, the upper opening of the flexible diaphragm 40 is fluid-tightly closed by the partition member 38, so as to define an equilibrium chamber 78 which is filled with the non-compressible fluid and whose volume is easily changeable owing to the deformation of the diaphragm 40, for accommodating any change of the pressure of the fluid. In other words, the primary chamber 62 and the equilibrium chamber 78 are provided on the upper and lower sides of the partition member 38, respectively, and the auxiliary chamber 72 is provided in the inside space of the same 38. The equilibrium, chamber 78 is provided on one of both sides of the oscillating body 64 that is opposite to the other side thereof on which the auxiliary chamber 72 is provided. It emerges form the foregoing description that in the present embodiment the primary and auxiliary chambers 62, 72 as the pressure receiving chamber cooperate with the equilibrium chamber 78 to define a fluid chamber.

In an outer peripheral portion of the partition member 38, the annular plate portion 43 extending radially outward from the central partition wall 48 cooperates with the upper and lower covers 50, 52 to define a second orifice 80 which extends over one full turn along an outer circumferential surface of the cylindrical wall portion 46 of the partition wall 48 and whose opposite ends are communicated with the primary chamber 62 and the equilibrium chamber 78, respectively, via respective holes (not shown) formed through the upper and lower covers 50, 52. When the pressure of the fluid in the primary chamber 62 changes, the fluid flows through the second orifice 80 owing to a difference between respective pressures of the fluid in the primary chamber 62 and the fluid in the equilibrium chamber 78. In the present embodiment, the second orifice 80 is tuned to a frequency range lower than that to which the plurality of communication holes 44 as the first orifice are tuned. Therefore, when a low-frequency and large-amplitude vibration, such as shake of the power unit, is input to the present engine mount 10, the engine mount 10 exhibits an excellent vibration damping effect against the input vibration owing to the resonance of the fluid flowing through the second orifice 80. A length and a cross-sectional area of the second orifice 80 are so pre-selected as to exhibit the above-indicated effect.

Below the flexible diaphragm 40 defining the equilibrium chamber 78, there is provided a housing 82 as an outer tubular member which is formed of metal and which has a generally cylindrical shape having a deep bottom. An open end portion of the housing 82 is fitted in the lower member 26 of the second mounting member 14, and an annular plate portion 84 integrally projecting radially outward from the open end portion of the housing 82 is held in contact with a lower surface of the support member 77 supporting the diaphragm 40 and is sandwiched with the support member 77 by, and between, the caulking portion 28 of the upper member 24 of the second mounting member 14 and the flange portion 30 of the lower member 26 of the same 14, and the caulking portion 28 is caulked with the flange portion 30 so that the housing 82 is fixed to the second mounting member 14 such that the housing 82 externally covers the diaphragm 40.

An electromagnetic force generating device which provides an electromagnetic actuator 86 as a drive device is provided in an inside space of the housing 82. The actuator 86 includes an air-core coil member 88 which is fitted in, and fixed to, an inner circumferential surface of the housing 82; and a magnet member 92 which is externally fitted on, and fixed to, an output rod 90 as an output member or an axis member that extends through an air-core portion of the coil member 88. The magnet member 92 is movable relative to the coil member 88 in an axial direction thereof. Upon application of an electric current to the coil member 88, an electromagnetic force is produced between the coil member 88 and the magnet member 92, so that an oscillating force is applied to the output rod 90 in the axial direction (i.e., the vertical direction as viewed on the drawing sheet of FIG. 1).

More specifically described, the coil member 88 includes a first coil 94 and a second coil 96 which are coaxially aligned with each other, and a plurality of thin, annular plates 98 each formed of a ferromagnetic material are provided between the two coils 94, 96, and on each of an upper end surface of the first coil 94 and a lower end surface of the second coil 96, such that all the annular plates 98 are coaxially aligned with the two coils 94, 96. Thus, the single air-core coil member 88 is provided. The coil member 88 including the two coils 94, 96 and the annular plates 98 is fitted in the housing 82, and is fixedly assembled with the housing 82 in such a manner that each of axially opposite end portions of the coil member 88 is positioned by one or two fixing rings 100 which is or are press-fitted in, and thereby fixed to, the housing 82.

The magnet member 92 includes an annular, plate-like permanent magnet 102, and annular upper and lower blocks 104, 106 each formed of a ferromagnetic material are aligned with axially opposite ends of the permanent magnet 102, respectively. The output rod 90 extends through respective central holes formed through the permanent magnet 102 and the two blocks 104, 106. The permanent magnet 102 has two magnetic poles at the axially opposite ends thereof and accordingly the magnet member 92 as a whole has two magnetic poles at axially opposite ends thereof. The magnet member 92, i.e., a unit including the permanent magnet 102 and the upper and lower blocks 104, 106, has a length smaller than that of the air-core portion of the coil member 88, and is substantially coaxially received in the air-core portion of the same 88, such that the magnetic member 92 is movable relative to the spring member 88 in the axial direction thereof.

Axially opposite end portions of the output rod 90 to which the magnetic member 92 is fixed project axially outward from axially opposite ends of the air-core portion of the coil member 88, and a leaf spring 108 bridges between the housing 82 and each of the two projecting end portions of the output rod 90. Each of the two leaf springs 108, 108 is formed of an elastic material such as metal, and has a thin, annular, plate-like shape. An inner peripheral portion of each leaf spring 108 is sandwiched by, and between, a pair of fixing rings 110, 110 which are externally fitted on, and fixed to, the output rod 90, and is thereby fixed to the rod 90, and an outer peripheral portion of each leaf spring 108 is sandwiched by, and between, a pair of fixing rings 100, 100, or a fixing ring 100 and a fixing sleeve 111, which are press-fitted in, and fixed to, the housing 82. Thus, each leaf spring 108 is fixed to the housing 82. The pair of leaf springs 108 cooperate with each other to position the output rod 90 relative to the housing 82 and elastically support the same 90. Because of rigidity of the leaf springs 108, movement of the output rod 90 relative to the housing 82 in radial directions perpendicular to the axis line of the rod 90 is limited; and because of the elasticity of the leaf springs 108, movement of the rod 90 relative to the housing 82 in axial directions parallel to the axis line of the rod 90 is permitted. The housing 82 has a bottom wall which is opposed to the lower end portion of the output rod 90, and has, in a central portion of the bottom wall thereof, a recess 112 which permits the movements of the rod 90 relative to the housing 82 in the axial directions. A cushion rubber layer 114 is provided on a bottom surface of the recess 112, and cooperates with the housing 82 to provide a stopper which softly stops an excessively large axial movement of the rod 90, thereby limiting the axial movement of the same 90. Though not shown in the drawings, each of the leaf springs 108, 108 may have one or more through-holes which is or are formed through the thickness thereof and whose size and/or shape may be changed, for the purpose of adjusting the degree of elasticity of the each leaf spring 108. For example, each leaf spring 108 may have one or more swirl-like through-holes which extend from an inner periphery thereof toward an outer periphery thereof.

An outside press member 116 is fixed to the upper axial end portion of the output rod 90. The outside press member 116 is formed of a hard material such as metal, and has an inverted-dish-like shape. A cylindrical fitting member 118 formed of metal is fixed by welding to a central portion of a lower surface of the press member 16, such that the fitting member 118 projects downward. The upper axial end portion of the rod 90 is fixed by, e.g., press-fitting to the fitting member 118, so that the outside press member 116 is fixed to the output rod 90 such that the press member 116 extends from the upper axial end portion of the rod 90, along a plane perpendicular to the axis line of the same 90. A seal member 120 formed of an elastic rubber sheet is vulcanized to an outer peripheral portion of the outside press member 116, such that the seal member 120 extends like a skirt. An outer peripheral portion of the seal member 120 is vulcanized to the fixing sleeve 111 which is press-fitted in, and fixed to, the housing 82. Thus, the upper opening of the housing 82 is closed by the outside press member 116 and the seal member 120, so that the electromagnetic actuator 86 including the coil member 88 and the magnetic member 92 is sealed from the outside space and foreign matters are prevented from entering the actuator 86.

In an inside space of the electromagnetic actuator 86 that is sealed from the outside space, a support member 122, formed of metal, is provided between the seal member 120 and the upper one of the two leaf springs 108. The support member 122 is formed of a rigid material such as metal, and has a generally annular or cylindrical shape. The support member 122 is inserted in the housing 82, and an outer peripheral portion of the support member 122 is sandwiched by, and between, the fixing ring 100 and the fixing sleeve 111 each of which is fixed by press-fitting to the housing 82, so that the support member 122 is fixedly supported by the housing 82. The output rod 90 extends through a central hole of the support member 122, such that the rod 90 is spaced by a predetermined distance from the same 122 and projects upward from the same 122. The support member 122 has two stepped portions formed in a radially intermediate portion thereof, so that a central portion of the support member 122 stepwise projects in an axially upward direction. The entirety of the support member 122, except for the outer peripheral portion thereof sandwiched by the fixing ring 100 and the fixing sleeve 111, is spaced above from the upper leaf spring 108, to allow elastic deformation of the same 108. An inner peripheral portion of the support member 122 provides an annular spring seat portion 124 which is opposed to, and spaced from, the outside press member 116 in the axial direction of the output rod 90. A compression coil spring 126 as a second biasing device or member is provided between respective opposed surfaces of the spring seal portion 124 and the outside press member 116, such that the outside coil spring 126 surrounds the rod 90. The coil spring 126 applies a biasing force to the outside press member 116 in a direction in which the press member 116 is moved away from the support member 122.

Thus, the outside press member 116 fixed to the upper end of the output rod 90 is pressed upward by the biasing force of the outside coil spring 126 against the oscillating body 64 via the flexible diaphragm 40. The diaphragm 40 includes a thick-walled central portion which has a thickness greater than that of an outer peripheral portion thereof and against which the outside press member 116 is pressed. Thus, the diaphragm 40 enjoys an improved durability. The inside press member 74 is held in contact with an upper surface of the oscillating body 64 and the outside press member 116 is held in contact with a lower surface of the same 64, and the inside coil spring 76 applies the downward biasing force to the same 64 via the inside press member 74 and the outside coil spring 126 applies the upward biasing force to the same 64 via the outside press member 116. In a state in which the respective biasing forces of the inside and outside coil springs 76, 126 are balanced, the oscillating body 64 is held at a neutral (or balanced) position thereof.

In the present embodiment, respective dimensions of the inside and outside coil springs 76, 126 are so pre-selected that at a position where the elastic support plate 68 of the oscillating body 64 has substantially no elastic deformation and the two leaf springs 108 of the electromagnetic actuator 86 have substantially no elastic deformation, the respective biasing forces of the two coil springs 76, 126 are balanced and the oscillating body takes its neutral position. It is preferred that the two coil springs 76, 126 have a substantially equal elastic coefficient. In addition, the respective elastic coefficients of the two coil springs 76, 126 are so pre-selected that when the output rod 90 is repeatedly oscillated in its axial direction upon application of electric power to the actuator 86, the inside and outside press members 74, 116 can be stably maintained in pressed contact with the oscillating body 64, and that the oscillating body 64 can be efficiently moved by the drive force applied thereto from the rod 90, against the biasing force of the inside or outside coil spring 76, 126.

In the engine mount 10 constructed as described above, electric power is supplied to the coils 94, 96 of the coil member 88 via a lead wire 128, so that two magnetic poles are produced at the axially opposite end portions of the coil member 88 and so that a magnetic attractive or repulsive force is exerted to the magnet member 92 or a Lorentz's force is exerted to an electric current flowing through the coils 94, 96 located in the magnetic field of the magnet member 92. As a result, a drive force is produced which moves the magnetic member 92 relative to the coil member 88, in the axial direction of the output rod 90, so that the drive force is applied to the oscillating body 64 via the rod 90. The elastic support plate 68 is elastically deformed to allow the oscillating body 64 to move or displace upward and downward. When an alternating current having a frequency corresponding to that of a vibration to be damped, is supplied to the coils 94, 96, the oscillating body 64 is repeatedly displaced (i.e., oscillated) at that frequency. As a result, the pressure of the fluid in the auxiliary chamber 72 is changed, and this change is transmitted to the fluid in the primary chamber 62 based on the fluid flowing through the communication holes 44. Thus, the pressure of the fluid in the primary chamber 62 is changed at the frequency corresponding to that of vibration to be damped, and an oscillating force having the frequency corresponding to that of vibration to be damped is applied to the first and second mounting members 12, 14. Accordingly, in the case where the oscillating body 64 is oscillated at a frequency and an amplitude corresponding to those of a main vibration to be input to, e.g., the vehicle's body, the engine mount 10 can produce such an oscillating force which can offset the main vibration and thereby exhibit an active vibration damping effect. That is, the oscillating body 64 can actively accommodate or absorb the change of pressure of the fluid in the primary chamber 62 upon inputting of the vibration to be damped, and thereby lower the spring constant of the mount 10 down to zero, thereby exhibiting an active vibration damping effect.

A current-supply control device (not shown) is employed to control the supply of electric current to the coils 94, 96 of the coil member 88, so that the electric current has a frequency and an amplitude corresponding to those of vibration to be damped, and has an appropriate angular phase. To this end, for example, an acceleration sensor is employed to detect directly the vibration of vehicle's body to be damped, and supply an electric signal representing the detected vibration, to the control device; or a reference signal, such as a crank-angle signal or an ignition pulse signal, that relates to the vibration of vehicle's body to be damped is supplied to the control device. The control device may be adapted to determine a phase and an amplitude of the electric current based on a relationship (e.g., a data map obtained in advance from experiments) between the phase or amplitude and one or more appropriate reference factors such as rotation number or acceleration of the engine, shift position, and/or temperature. The current-supply control device can utilize an adaptive control including a feedback circuit.

According to the concept of the present invention, it is not essentially required in the engine mount 10 that the output rod 90 be physically directly fixed to the oscillating body 64. Rather, the respective biasing forces of the inside and outside coil springs 76, 126 maintain the output rod 90 in pressed contact with the oscillating body 64 via the flexible diaphragm 40, so that the drive force is transmitted from the rod 90 to the oscillating body 64 and the body 64 is displaced or oscillated as a unit with the rod 90.

Therefore, when the output rod 90 is assembled with other elements, no great external forces are exerted to the oscillating body 64 or the flexible diaphragm 40. Thus, the engine mount 10 is advantageously freed of the problem that the durability of the oscillating body 64 or the diaphragm 40 is lowered because of excessive deformation thereof, or strain remaining therein, resulting from those external forces. In addition, since the output rod 90 is assembled with the oscillating body 64, by being just held in pressed contact with the same 64 via the diaphragm 40, the engine mount 10 is effectively prevented from the problems resulting from the defective attachment of the output rod 90 to the oscillating body 64 and/or the breakage of the attaching device or means. Thus, the engine mount enjoys the excellent durability, quality, and operation stability. Moreover, there is no need to carry out the difficult operation that the output rod 90 is fixed to the oscillating body 64 in a mass of the non-compressible fluid to fill the fluid chamber of the engine mount 10. Thus, the engine mount 10 enjoys improved productivity.

Meanwhile, it is not required that the fixing of the outside press member 116 to the output rod 90 of the electromagnetic actuator 86 be carried out in a mass of non-compressible fluid. Rather, it is possible that the actuator 86 be produced as a unit separate from a main body of the engine mount 10 that defines the fluid chamber 62, 72, 78 and, before the actuator 86 is assembled with the main body, the press member 116 be fixed to the rod 90. Thus, the engine mount 10 can be easily produced. In addition, press-fitting of elements can be carried out with small loads, without damaging other elements. In short, the engine mount 10 as described above can be advantageously produced in such a manner that, first, the partition member 38 and the flexible diaphragm 40 are assembled with the integral vulcanized body including the first mounting member 12, the upper member 24, and the rubber body 16, in a mass of non-compressible fluid, to fill the primary chamber 62, the auxiliary chamber 72, and the equilibrium chamber 78 with the non-compressible fluid; second, the thus obtained fluid-filled unit is assembled, in the atmosphere, with the electromagnetic actuator 86 and the lower member 26 each of which is produced separately from the fluid-filled unit; and then, the upper member 24 is fixed, by caulking, to the lower member 26.

The engine mount 10 has the equilibrium chamber 78 which is communicated with the primary chamber 62 via the second orifice 80. Accordingly, in the state in which the mount 10 is actually used in the automotive vehicle, i.e., is under the static load of the power unit of the vehicle, the equilibrium chamber 78 effectively accommodates or absorbs the increase of the pressure of the fluid in the primary and/or auxiliary chambers 62, 72. Therefore, the engine mount 10 stably exhibits the vibration damping effect based on the control of the pressure of the fluid chambers 62, 72. In addition, when the vibration having the low frequency to which the second orifice 80 is tuned is input to the engine mount 10, the mount 10 exhibits the passive vibration damping effect based on the resonance of the fluid flowing through the second orifice 80.

In the engine mount 10, the respective biasing forces of the inside and outside coil springs 76, 126 are balanced. Accordingly, the oscillating body 64 can be oscillated by the electromagnetic actuator 86, without needing a biasing drive force (or drive electric current) Therefore, the oscillating body 64 can be driven or oscillated with high energy efficiency.

Since the present engine mount 10 employs the coil springs 76, 126 as the first and second biasing devices or members, the respective elastic coefficients of the biasing devices can be tuned or changed in a wide range, without lowering the durability of the biasing devices, and can be easily adapted to the vibration to be damped and/or the performance of the drive device or means employed. Thus, the engine mount 10 can advantageously exhibit any desired vibration damping effect.

FIGS. 2, 3, 4, 5, and 6 show respective engine mounts 130, 142, 146, 148, 154 as the second, third, fourth, fifth, and sixth embodiments of the present invention. FIGS. 2–6 show only respective structural features of the engine mounts 130, 142, 146, 148, 154 that differ from the engine mount 10 as the first embodiment shown in FIG. 1. The same reference numerals as used in FIG. 1 are used to designate the corresponding elements or parts of each of the engine mounts 130, 142, 146, 148, 154 shown in FIGS. 2–6, and the detailed description thereof is omitted.

Figure 2:
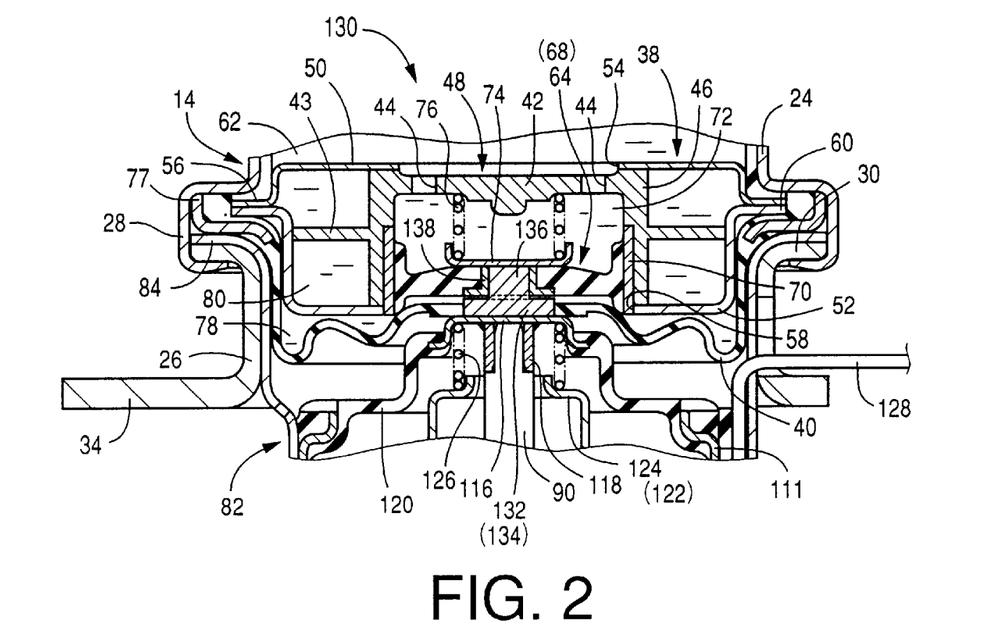
FIG. 2 is a longitudinal cross section of a relevant portion of an engine mount for use in an automotive vehicle, as a second embodiment of the present invention.

FIG. 2 shows the engine mount 130 as the second embodiment. In this engine mount 130, a central portion of a flexible diaphragm 40 with which an outside press member 116 is held in pressed contact is vulcanized to a connecting member 132. The connecting member 132 is formed of a hard material such as metal, and includes a disc-like base portion 134 and a cylindrical-rod-like press-fit portion 136 integrally projecting upward from a central portion of the base portion 134. An oscillating body 64 includes, in place of the oscillating plate 66 employed in the engine mount 10, a generally cylindrical fitting member 138 formed of metal; and an elastic support plate 68 whose central portion is vulcanized to the fitting member 138. The press-fit portion 136 of the connecting member 132 is fixed by press-fitting to a central hole of the fitting member 138 through a lower opening of the same 138. Thus, the fitting member 138 and the connecting member 132 (i.e., the press-fit portion 136) extend through the thickness of the oscillating body 64, i.e., from an outside surface thereof to an inside surface thereof.

In the state in which the connecting member 132 is fixed to the central portion of the oscillating body 64, the outside press member 116 is directly held in pressed contact with a lower surface of the connecting member 132, an inside press member 74 is directly held in pressed contact with an upper surface of the connecting member 132, and a drive force of an electromagnetic actuator 86 is transmitted from an output rod 90 to the oscillating body 64 via the connecting member 132.

Accordingly, the engine mount 130 constructed as described above not only exhibits each of the same effects as those of the engine mount 10, but also enjoys improved durability of the oscillating body 64 and the flexible diaphragm 40 because those elements 64, 40, fixed to each other, are not moved relative to each other and accordingly not worn out by the excessive friction which would result from the repetitive relative movements thereof. In addition, the connecting member 132 directly receives respective biasing forces of inside and outside coil springs 76, 126, and the oscillating body 64 and the diaphragm 40 only indirectly receive the biasing forces of the two coil springs 76, 126. Thus, the engine mount 130 enjoys still higher durability.

Figure 3:
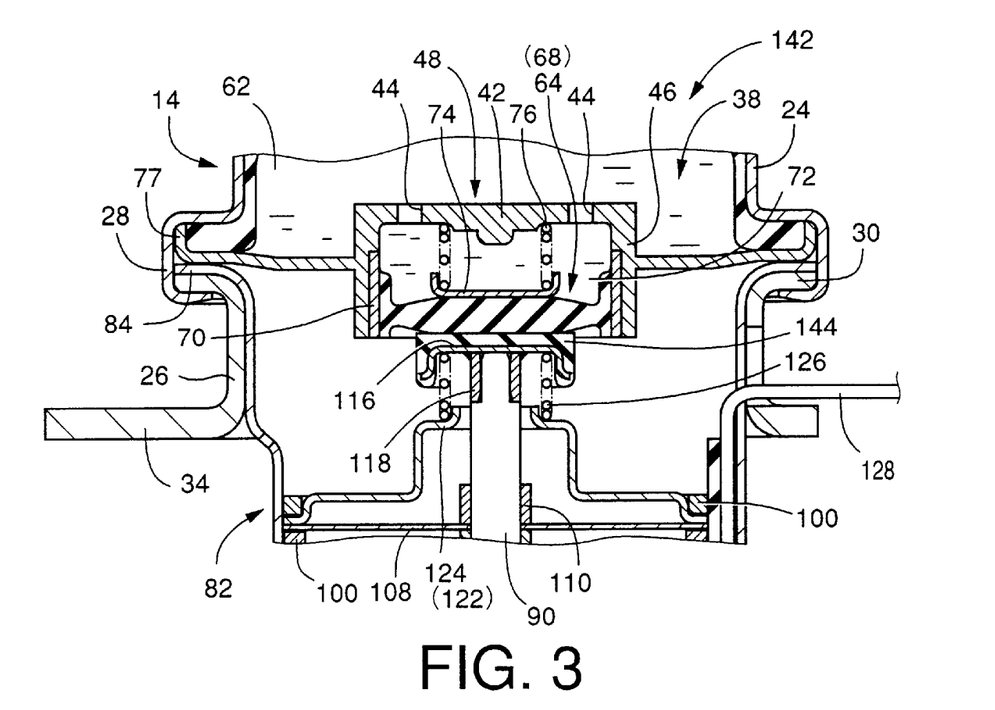
FIG. 3 is a longitudinal cross section of a relevant portion of an engine mount for use in an automotive vehicle, as a third embodiment of the present invention.

FIG. 3 shows the engine mount 142 as the third embodiment. The engine mount 142 does not have the equilibrium chamber 78 or the flexible diaphragm 40 of the engine mount 10, and an inside space of a housing 82 formed of metal that is communicated with the atmosphere is provided on one of both sides of an oscillating body 64 that is opposite to the other side thereof on which an auxiliary chamber 72 is provided. Thus, an outside press member 116 fixed to an upper end of an output rod 90 of an electromagnetic actuator 86 is held, by an outside coil spring 126, in direct contact with a lower or outside surface of the oscillating body 64, that is, without the diaphragm 40 of the engine mount 10 being provided therebetween. An inside press member 74 is held, by an inside coil spring 76, in pressed contact with an inside surface of the oscillating body 64. A contact surface of the outside press member 116 that contacts the oscillating body 64 is covered with a rubber layer 144 which protects the oscillating body 64. Thus, the engine mount 142 enjoys improved durability.

The engine mount 142 constructed as described above cannot exhibit the specific effects based on the equilibrium chamber 78 and the second orifice 80, but can exhibit each of the other various effects of the engine mount 10. In particular, the engine mount 142 is advantageously used in those cases in which an initial load such as the load of a power unit is zero or very small. In addition, since the engine mount 142 has no thin diaphragm between the oscillating body 64 and the outside press member 116, the engine mount 142 is completely freed of the problem that the thin diaphragm may become damaged, and accordingly enjoys improved durability.

The engine mount 142 may be modified such that an equilibrium chamber is provided in an inside hollow space of a first mounting member 12 and is communicated with a primary chamber 62 via a second orifice. The thus modified engine mount 142 can exhibit, like the engine mount 10, a passive vibration damping effect based on the fluid flowing through the second orifice, without employing a diaphragm between the oscillating body 64 and the outside press member 116.

Figure 4:
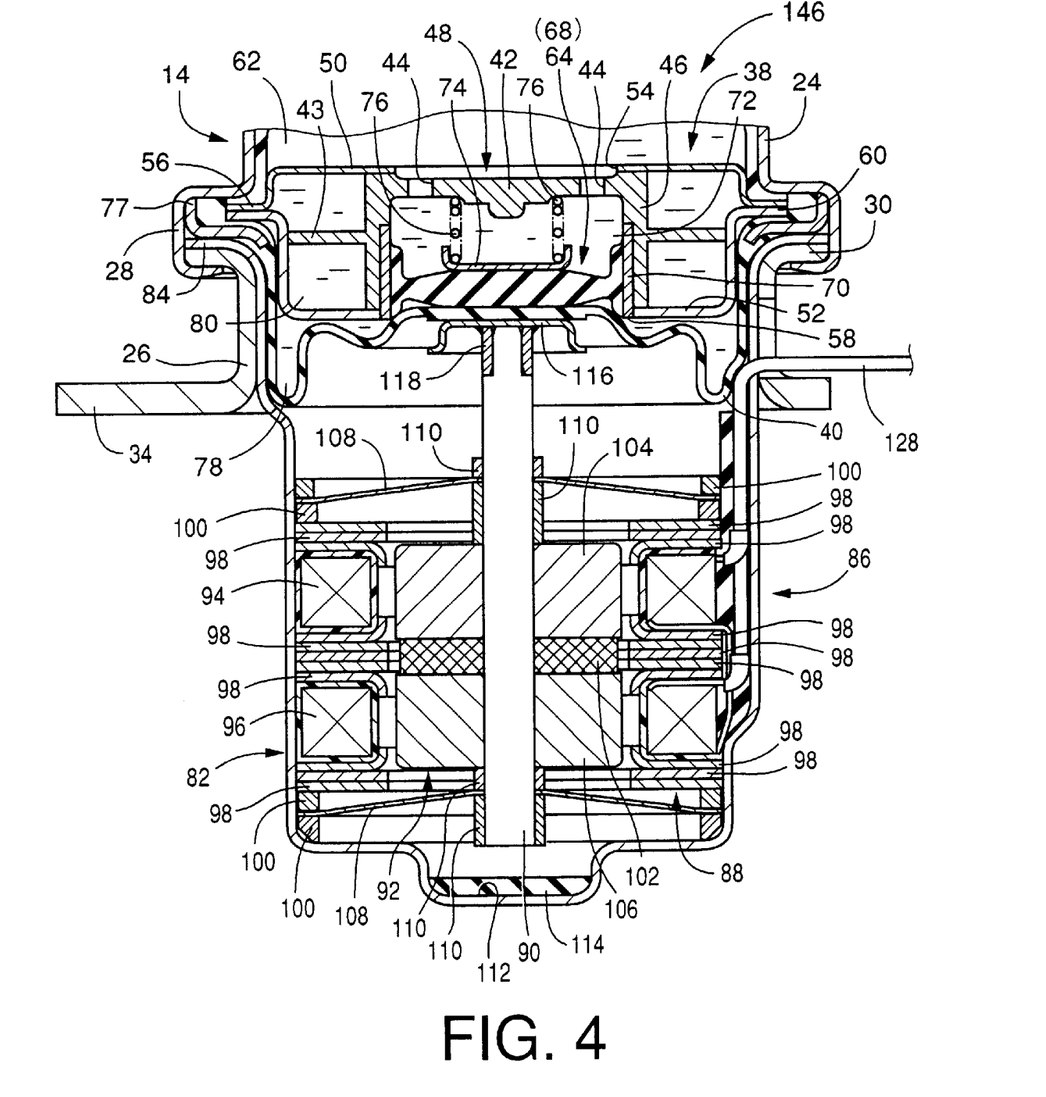
FIG. 4 is a longitudinal cross section of a relevant portion of an engine mount for rise in an automotive vehicle, as a fourth embodiment of the present invention.

FIG. 4 shows the engine mount 146 as the fourth embodiment. The engine mount 146 does not employ the outside coil spring 126 or the coil-spring support member 122 of the engine mount 10, but each of two leaf springs 108, 108 of an electromagnetic actuator 86 has a disc-spring-like shape which is inclined in an axially upward direction thereof as viewed in a radially inward direction thereof. Respective biasing forces of the two leaf springs 108 are exerted to an output rod 90 in an axially upward direction thereof, so that an outside press member 116 is pressed against an oscillating body 64 via a flexible diaphragm 40. Owing to the upward biasing forces of the two leaf springs 108 and a downward biasing force of an inside coil spring 76, an upper end of the output rod 90, i.e., the outside press member 116 is held in pressed contact with the oscillating body 64. Thus, in the fourth embodiment, the leaf springs 108 of the electromagnetic actuator 86 provide the second biasing device.

The engine mount 146 constructed as described above only exhibits each of the same effects as those of the engine mount 10, but also enjoys simplified construction and improved productivity because the second biasing device is provided by the leaf springs 108 as part of the electromagnetic actuator 86.

Figure 5:
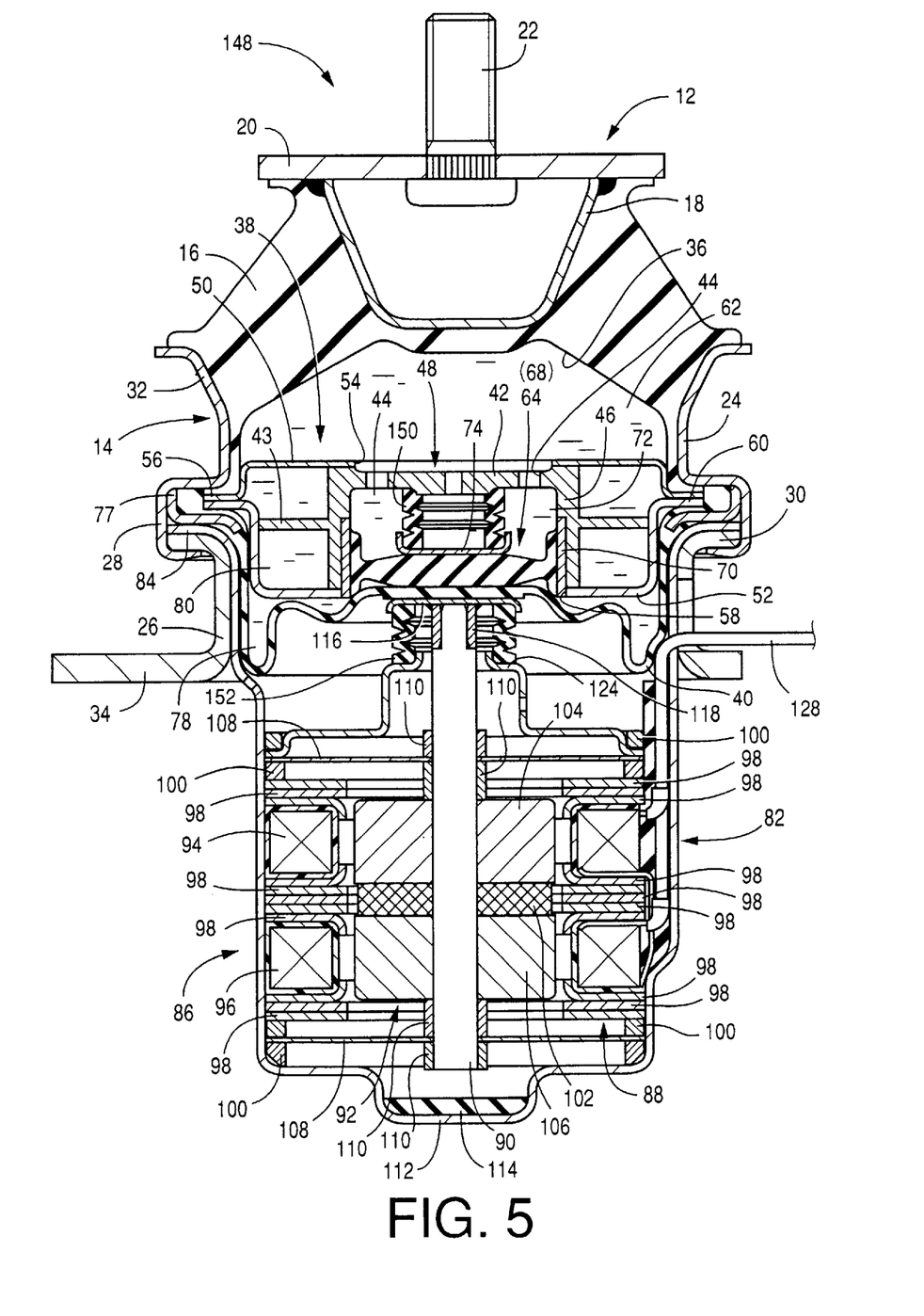
FIG. 5 is a longitudinal cross section of an engine mount for use in an automotive vehicle, as a fifth embodiment of the present invention.

FIG. 5 shows the engine mount 148 as the fifth embodiment. The engine mount 148 employs, in place of the inside and outside coil springs 76, 126 of the engine mount 10, an inside rubber spring 150 and an outside rubber spring 152 which cooperate with each other to hold an inside press member 74 and an outside press member 116 in an inside surface and an outside surface of an oscillating body 64, respectively. Each of the two rubber springs 150, 152 has a cylindrical bellows structure, and exhibits an elastic characteristic similar to that of each coil spring 76, 126, that is, is elastically deformed, compressed and expanded, in an axial direction thereof, like each coil spring 76, 126. Thus, in the engine mount 148, the inside and outside rubber springs 150, 152 provide the first and second biasing devices or members, respectively. The engine mount 148 exhibits each of the same effects as those of the engine mount 10.

Figure 6:
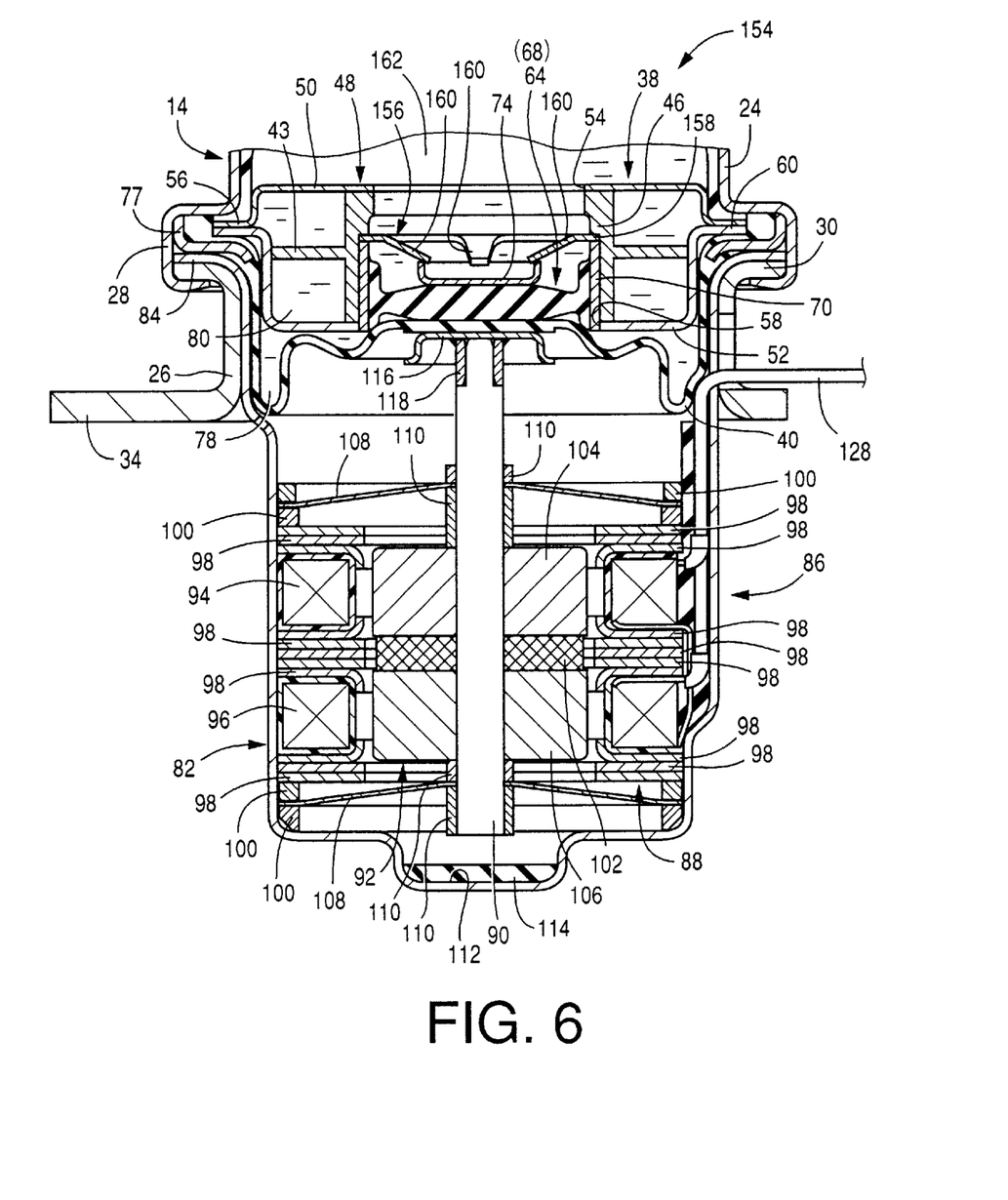
FIG. 6 is a longitudinal cross section of a relevant portion of an engine mount for use in an automotive vehicle, as a sixth embodiment of the present invention.

FIG. 6 shows the engine mount 154 as the sixth embodiment. Like the engine mount 146, the engine mount 154 utilizes, as the second biasing device, two leaf springs 108 of an electromagnetic actuator 86, in place of the outside coil spring 126 of the engine mount 10. In addition, the engine mount 154 employs, as the first biasing device or member, a leaf spring 156 formed of an elastic material such as metal, in place of the inside coil spring 76 of the engine mount 10. The leaf spring 156 includes a thin annular portion 158, and a plurality of (e.g., four) elastic tongues 160 which integrally project radially inward from the annular portion 158, such that all the elastic tongues 160 are inclined in one of axially opposite directions of the leaf spring 156, that is, in downward direction, and each are elastically deformed upon application of an external force thereto.

An outer peripheral portion of the annular portion 158 of the leaf spring 156 is sandwiched and fixed by, and between, a fitting ring 70 and a cylindrical wall portion 46 of a central partition wall 48. Thus, each of the elastic tongues 160 projects in a radially inward direction from an inner circumferential surface of the partition wall 48 into an inside space of the same 48, in a direction inclined downward as viewed in the radially inward direction. A free or lower end portion of each elastic tongue 160 is engaged with a top surface of an outer peripheral wall of the inside press member 74 held in contact with an upper or inside surface of the oscillating body 64, so that respective biasing forces of the elastic tongues 160 are applied to the oscillating body 64 in a downward direction. An elastic coefficient of the elastic tongues 160 are so pre-selected that owing to the elastic deformation of the elastic tongues 160, the inside press member 74 is maintained in pressed contact with the oscillating body 64 when the oscillating body 64 is displaced.

In the engine mount 154, the central partition wall 48 has such a cylindrical shape which does not include the top wall portion 42 of the central partition wall 48 of the engine mount 10. Accordingly, the engine mount 154 has a single pressure receiving chamber 162 in place of the primary and auxiliary chambers 62, 72 of the engine mount 10. Therefore, the pressure of non-compressible fluid in the pressure receiving chamber 162 is directly controlled by the displacement of the oscillating body 64.

The engine mount 154 constructed as described above exhibits the same effects as those of the engine mount 10. In addition, since the pressure of the pressure receiving chamber 162 is directly controlled by the displacement of the oscillating body 64 and accordingly the engine mount 154 is freed of the problem that the resistance to the flow of non-compressible fluid is increased by the anti-resonance effect of the fluid existing in the communication holes 44 of the engine mount 10, the engine mount 154 can exhibit an active vibration damping effect against vibrations in a wide frequency range including a high frequency range. However, the engine mount 154 may be modified such that the first orifice is defined by a plurality of communication passages which are formed between the inside press member 74 and the elastic tongues 160 of the leaf spring 156.

While the present invention has been described in its preferred embodiments, it is to be understood that the above-described embodiments are just examples and the present invention is by no means limited to the details of those embodiments.

In each of the first to sixth embodiments, the drive device is provided by the electromagnetic actuator 86 including the output rod 90 which is driven or moved in its axial direction by the electromagnetic force or Lorentz's force. However, the drive device that is employed in the present invention is not limited to the actuator 86 employed in the illustrated embodiments, but may be provided by any device including an output member which can be driven or moved in the direction of displacement of the oscillating body 64.

Each of the first to sixth embodiments relates to a vibration damping device, i.e., an engine mount having a construction in which the first and second mounting members 12, 14 are opposed to each other in the axial direction of the mount, i.e., in a direction in which a main vibration load is input to the mount. However, the present invention may be also applied to a bushing-type vibration damping device as disclosed in Japanese Patent Application TOKU-KAI-HEI 5(1993)-149372. The bushing-type vibration damping device includes a central axis member; an outer tubular member which is spaced radially outward from the axis member; an elastic rubber body which connects between the axis member and the tubular member; and a pressure receiving chamber which is provided between the axis member and the tubular member and which is filled with a non-compressible fluid.

The concept of the present invention is also applicable to not only automotive-vehicle engine mounts but also automotive-vehicle body mounts and differential mounts, and additionally to various fluid-filled active vibration damping devices which are employed in other apparatuses than automotive vehicles.

It is to be understood that the present invention may be embodied with other changes, improvements, and modifications that may occur to a person skilled in the art without departing from the scope and spirit of the invention defined in the appended claims.

What is claimed is:

1. A fluid-filled active vibration damping device for damping a vibration of an object, comprising:

an elastic body which is elastically deformed when the vibration is input from the object to the damping device and which partially defines a pressure receiving chamber as a portion of a fluid chamber filled with a non-compressible fluid;

an oscillating body which partially defines the pressure receiving chamber;

a drive device which is different from the object and which actively oscillates the oscillating body, so as to control a pressure of the non-compressible fluid in the pressure receiving chamber, the drive device comprising an output member which is formed independent of the oscillating body and which is movable together with the oscillating body in a direction of oscillation of the oscillating body;

a first biasing device which biases the oscillating body toward the output member of the drive device; and a second biasing device which biases the output member of the drive device toward an outside surface of the oscillating body, so that the output member is held in contact with the outside surface of the oscillating body.

2. A fluid-filled active vibration damping device according to claim 1, wherein the oscillating body comprises:

a hard displaceable member which is provided in a central portion thereof with which the output member of the drive device is held in contact; and an elastically deformable, annular support member which is provided around the displaceable member and which allows, when being elastically deformed, the displaceable member to be displaced.

3. A fluid-filled active vibration damping device according to claim 1, further comprising:

an inside press member which has a planar contact surface held in contact with an inside surface of the oscillating body; and an outside press member which is provided integrally with the output member of the drive device and which has a planar contact surface held in contact with the outside surface of the oscillating body, wherein the first biasing device indirectly biases the oscillating body via the inside press member and the second biasing device indirectly biases the output member via the outside press member.

4. A fluid-filled active vibration damping device according to claim 1, wherein the pressure receiving chamber comprises a primary chamber in which the pressure of the non-compressible fluid is directly changed when the elastic body is elastically deformed; and an auxiliary chamber in which the pressure of the non-compressible fluid is directly changed when the oscillating body is oscillated, and wherein the damping device further comprises means for defining a first orifice for fluid communication between the primary chamber and the auxiliary chamber, so that a change of the pressure of the non-compressible fluid in the auxiliary chamber that is caused by the oscillation of the oscillating body is transmitted to the non-compressible fluid in the primary chamber via the first orifice.

5. A fluid-filled active vibration damping device according to claim 1, further comprising:

a flexible diaphragm which partially defines an equilibrium chamber which is provided on one of both sides of the oscillating body that is opposite to the other side thereof on which the pressure receiving chamber is provided, the equilibrium chamber being filled with the non-compressible fluid, a volume of the equilibrium chamber being changed by deformation of the flexible diaphragm, the pressure receiving chamber and the equilibrium chamber cooperating with each other to provide the fluid chamber; and means for defining a second orifice for fluid communication between the pressure receiving chamber and the equilibrium chamber, wherein the output member of the drive device is formed independent of the oscillating body and the flexible diaphragm and is held in indirect contact with the outside surface of the oscillating body via the flexible diaphragm.

6. A fluid-filled active vibration damping device according to claim 5, wherein the oscillating body comprises a hard displaceable member which is provided in a central portion thereof with which the output member of the drive device is held in contact; and an elastically deformable, annular support member which is provided around the displaceable member and which allows, when being elastically deformed, the displaceable member to be displaced, and wherein the flexible diaphragm comprises a hard connecting member which is provided in a central portion thereof sandwiched by, and between, the displaceable member of the oscillating body and the output member of the drive device and which is fixed to the displaceable member.

7. A fluid-filled active vibration damping device according to claim 1, further comprising a first mounting member and a second mounting member which are elastically connected to each other by the elastic body, wherein the oscillating body is supported by the second mounting member such that the oscillating body is displaceable, and the drive device is supported by the second mounting member, and wherein one of the first and second mounting members is fixed to the object whose vibration is to be damped by the damping device.

8. A fluid-filled active vibration damping device according to claim 1, wherein the drive device comprises an electromagnetic drive device which includes an axis member as the output member; an outer tubular member which is spaced outward from the axis member in a direction perpendicular to the axis member; and an electromagnetic force generating device which generates, upon application of an electric power thereto, an electromagnetic force for moving the axis member relative to the outer tubular member in an axial direction parallel to the axis member, and wherein the second biasing device comprises at least one annular leaf spring which is provided between the axis member and the outer tubular member, such that an inner peripheral portion of the annular leaf spring is fixed to the axis member and an outer peripheral portion thereof is fixed to the outer tubular member, so that the annular leaf spring positions the axis member relative to the outer tubular member in the direction perpendicular to the axis member while allowing the axis member to be moved relative to the outer tubular member in the axial direction.

9. A fluid-filled active vibration damping device according to claim 1, wherein the second biasing device biases the output member of the drive device toward the outside surface of the oscillating body, so that the output member is held in direct contact with the outside surface of the oscillating body.

10. A fluid-filled active vibration damping device according to claim 1, wherein the second biasing device biases the output member of the drive device toward the outside surface of the oscillating body, so that the output member is held in indirect contact with the outside surface of the oscillating body.

11. A fluid-filled active vibration damping device according to claim 1, wherein the drive device comprising the output member is provided outside the fluid chamber comprising the pressure receiving chamber partially defined by the oscillating body, wherein the first biasing device is provided inside the pressure receiving chamber, and biases the oscillating body toward the output member of the drive device, and wherein the second biasing device is provided outside the fluid chamber, and biases the output member of the drive device toward the outside surface of the oscillating body, so that the output member formed independent of the oscillating body is held in contact with the outside surface of the oscillating body.

* * * * *